(12) United States Patent
Schwarz

(10) Patent No.: US 7,851,022 B2
(45) Date of Patent: Dec. 14, 2010

(54) GALVANIC ANODE SYSTEM FOR CORROSION PROTECTION OF STEEL AND METHOD FOR PRODUCTION THEREOF

(76) Inventor: Wolfgang Schwarz, Josefstädterstrasse 65/6, 1080 Vienna (AT)

( * ) Notice: Subject to any disclaimer, the term of this patent is extended or adjusted under 35 U.S.C. 154(b) by 152 days.

(21) Appl. No.: 11/573,155

(22) PCT Filed: Aug. 2, 2005

(86) PCT No.: PCT/AT2005/000304

§ 371 (c)(1),
(2), (4) Date: Feb. 2, 2007

(87) PCT Pub. No.: WO2006/012660

PCT Pub. Date: Feb. 9, 2006

(65) Prior Publication Data

US 2007/0175750 A1    Aug. 2, 2007

(30) Foreign Application Priority Data

Aug. 4, 2004    (AT)    ............................. A 1344/2004

(51) Int. Cl.
*B05D 3/12* (2006.01)
(52) U.S. Cl. .................... 427/355; 427/299; 427/421.1; 427/428.01; 205/730; 205/731; 205/732; 205/733; 205/734; 204/196.23; 204/196.24; 204/196.25
(58) Field of Classification Search .......... 204/196.23, 204/196.24, 196.25; 205/730–734; 427/355, 427/299, 421.1, 428.01
See application file for complete search history.

(56) References Cited

U.S. PATENT DOCUMENTS

| 4,836,768 | A |   | 6/1989  | Wilson et al.   |         |
|-----------|---|---|---------|-----------------|---------|
| 5,292,411 | A | * | 3/1994  | Bartholomew et al. | 205/731 |
| 5,650,060 | A | * | 7/1997  | Huang et al.    | 205/730 |
| 5,685,837 | A | * | 11/1997 | Horstmann       | 604/20  |
| 6,303,017 | B1| * | 10/2001 | Page et al.     | 205/734 |
| 2002/0023848 | A1 | * | 2/2002 | Whitmore | 205/734 |

OTHER PUBLICATIONS

English translation of International Preliminary Report on Patentability for corresponding International application No. PCT/AT2005/000304 dated Feb. 20, 2007.

* cited by examiner

*Primary Examiner*—Bruce F Bell
(74) *Attorney, Agent, or Firm*—Drinker Biddle & Reath LLP

(57) ABSTRACT

The invention relates to a galvanic anode system for the corrosion protection of steel, comprised of a solid electrolyte and a galvanic anode material, preferably zinc and its alloys, glued to the solid electrolyte or embedded in the solid electrolyte. The solid electrolyte is characterised by a high ion conductivity and comprises at least one anionic and/or cationic polyelectrolyte and/or preferably at least one compound that forms complex compounds with the anode material, preferably with zinc. The solid electrolyte is produced by applying a coating agent, preferably as an aqueous dispersion or suspension, to the steel and/or to the mineral substructure, preferably to concrete. The anode material is characterised in that it forms a galvanic element in combination with the solid electrolyte and the steel to be protected, in which the steel forms the cathode. The inventive galvanic anode system is further characterised in that the anode material is applied to the surface of the solid electrolyte as a foil, network or grid, preferably by gluing, and/or is embedded in the solid electrolyte.

27 Claims, No Drawings

GALVANIC ANODE SYSTEM FOR CORROSION PROTECTION OF STEEL AND METHOD FOR PRODUCTION THEREOF

CROSS REFERENCE TO RELATED APPLICATION

The present application is a 35 U.S.C. §§371 national phase conversion of PCT/AT2005/000304, filed 2 Aug. 2005, which claims priority of Austrian Patent Application No A1344/2004 filed Aug. 4, 2004, the disclosures of which are herein incorporated by reference. The PCT Application was published in the Germany Language.

BACKGROUND OF THE INVENTION

Corrosion of the steel reinforcement is one of the essential causes for the increased maintenance and repair costs and, consequently, for shortening the useful life of concrete structures. Corrosion of the steel reinforcement is caused by the penetration of chlorides into the concrete cover and/or by carbonisation of the concrete cover. Cathodic corrosion protection (CCP) has been established as a cost-effective, reliable and accepted method of preventing the corrosion of the steel reinforcement. Basically, it is differentiated between two CCP-systems: (1) CCP with external power supply, in which the CCP-system, which consists of an anode installed on the concrete surface or in the concrete structure and the steel reinforcement as cathode, is supplied with direct current from a power supply unit under the control of a control logic. (2) A galvanic CCP without external power supply, in which the anode forms a galvanic element with the steel reinforcement, which galvanic element supplies the current required for the corrosion protection of the steel reinforcement.

In galvanic CCP, the anode acts as a sacrificial anode and is slowly consumed. Usually, zinc and its alloys are used as the anode material. In EP 1 135 538 and in U.S. Pat. No. 4,506, 485, a method is described in which the anode material is applied to the concrete surface by flame spraying or by electric-arc spraying. In EP 668 373 A1, a method is described in which a zinc foil, which is coated with an ion-conducting gel, is glued to the concrete surface. Since the anode is consumed during operation of the CCP system, galvanic CCP systems have only a limited useful life. The useful life of such galvanic CCP systems ranges from 10 to 20 years, depending on the amount of zinc applied to the concrete surface and on the locally flowing galvanic currents.

In contrast to the galvanic CCP systems, the useful life of CCP systems with external power supply are only determined by the resistance of the anode to weathering and to the acid development at the anode/concrete interface. Such a system is described, e.g., in EP 1 068 164 B1. CCP systems with external power supply have the advantage over galvanic CCP systems that the current required for the corrosion protection of the steel reinforcement and the voltage applied can be adapted nearly arbitrarily to the requirements of the corrosion protection of the steel reinforcement via the power supply and electronic control units. However, the power supply and electronic control units and the electrical installations (electrical connections to the anodes, to the steel reinforcement and to the monitoring sensors) are expensive, CCP systems using an external power supply require permanent monitoring and maintenance.

In contrast to CCP systems using an external power supply, the voltage applied between anode and cathode in galvanic CCP systems is pre-determined by the galvanic element, e.g. zinc/reinforcement steel. The current flowing between anode and cathode is determined by the electrolytic resistance between anode and cathode and cannot be regulated externally. Therefore, in contrast to CCP systems with external power supply, galvanic CCP systems do not require an external power supply, and the expenditures for the electrical installations, for the electronic control units, maintenance and monitoring are negligibly low as compared to CCP systems using an external power supply.

The electrolytic resistance between anode and cathode is composed of the transition resistance anode/concrete, the electrolytic resistance of the concrete, and the transition resistance concrete/reinforcement steel. As is generally known, the electrolytic resistance of the concrete is highly dependent on the moisture of the concrete and, to a lesser degree, on the chloride content of the concrete. It is characteristic of galvanic CCP systems that products of galvanic oxidation (anodic oxidation) form at the interface anode/concrete, e.g. zinc oxides and zinc hydroxides in case of galvanic zinc anodes. These products increase the electrolytic resistance between anode and cathode in the course of the operation of the galvanic CCP (passivation of the zinc), primarily in a dry environment. This means that galvanic CCP systems require sufficient moisture of the concrete. This is particularly true for galvanic CCP systems in which the anode is applied to the concrete surface by flame spraying or by plasma spraying, as described e.g., in EP 1 135 538 or in U.S. Pat. No. 4,506,485.

For quite some time coatings of zinc or its alloys applied to the concrete surface by thermal spraying have been successfully used for the cathodic corrosion protection of concrete structures in sea water, such as, e.g., bridge components. Since they are close to the sea water, the concrete structures contain sufficient moisture to ensure a flow of current sufficient for the corrosion protection of the steel reinforcement.

In U.S. Pat. No. 6,471,851 and in WO 98/16670, the impregnation of the concrete surface with moisture-retention means before and after the application of the zinc by means of thermal spraying has been suggested. The moisture retention agents, however, do not prevent the formation of passivating zinc oxides and zinc hydroxides which reduce the flow of current to the steel reinforcement. As experience has shown, the moisture retention agents therefore must be repeatedly applied. This involves considerable costs, particularly with construction parts that are difficult to access.

U.S. Pat. No. 6,022,469 describes a galvanic anode system in which the formation of a passivating film is to be prevented by using an alkaline electrolyte between anode and concrete. The electrolyte contains alkaline hydroxide, by which the pH of the electrolyte is adjusted at at least 0.2 units above that pH at which the passivation of the anode occurs. As the person skilled in the art knows, an amount of acid equivalent to the flow of current will form during the operation of the galvanic sacrificial anode in addition to the passivating anodic oxidation products (zinc oxide, zinc hydroxide). This acid neutralizes the alkaline hydroxides in the electrolyte, so that the use of alkaline hydroxides does not constitute a solution for a long-lasting corrosion protection of the steel reinforcement by means of galvanic cathodic corrosion protection.

In EP 0 668 373, a galvanic anode system is described which consists of a zinc foil coated by an ion-conductive elastic pressure-sensitive hydrogel. The hydrogel contains a polymer adhesive, an electrolyte, e.g. sodium chloride dissolved in water, and hydrophilic polymers. The hydrogel-coated zinc foil is glued to the concrete and electrically contacted with the steel reinforcement. This galvanic anode system solves the problem of the variable concrete moisture by arrangement of an ion-conductive hydrogel electrolyte having a high water content (60-95%) between the galvanic zinc anode and the concrete surface. This system, however, has the disadvantage that the adhesion of the anode to the concrete surface is only slight. When moisture penetrates from the concrete or from the sides of the anodes, the hydrogel takes up water, and the adhesion of the zinc foil to the hydrogel and the adhesion of the hydrogel to the surface of the concrete gets lost. Therefore, galvanic zinc-hydrogel anode system can only be used on structural elements which are not exposed to permanent moisture or to a pervasive moisture. The production of the hydrogel and the production of the zinc foil/hydrogel composite material is highly complex and cost-intensive. Experience has shown that the zinc-hydrogel anode has only a very limited shelf life, and after a few months of storage, it can be used only to a very limited extent or not at all for the cathodic corrosion protection of the steel reinforcement.

SUMMARY OF THE INVENTION

It has been an object of the present invention to provide a galvanic anode system which can be employed for the reliable and long-lasting corrosion protection of the steel reinforcement both in a dry and also in a humid environment. Since the cost factor for the use of new technologies is decisive in the building industry, the inventive galvanic anode system should be producible and applicable at low costs and have a nearly unlimited shelf life.

Surprisingly, it has been shown that by coating the concrete with an ion-conductive coating and by embedding a suitable galvanic anode material, preferably zinc or alloys of zinc, into the inventive ion-conductive coating, or by applying the anode material to the surface of the ion-conductive coating and electric contacting of the anode material with the steel reinforcement, the set object could be achieved:

The inventive galvanic anode for the cathodic corrosion protection of the steel reinforcement is comprised of an ion-conductive coating applied to the concrete surface, in which ion-conductive coating a suitable anode material is embedded, or to which a suitable anode material is applied. The inventive ion-conductive coating acts as an electrolytic bridge between the anode and the steel to be protected or the material, e.g. concrete, in which the steel to be protected is embedded. In contrast to electrolyte solutions or electrolyte gels, the inventive ion-conductive coating acts as a solid electrolyte, wherein the solid electrolyte may also be elastic.

As the anode material, materials are suitable which, when applied to the inventive ion-conductive coating and electrically connected to the steel reinforcement, form a galvanic element in a manner that the steel reinforcement forms the cathode, wherein, when interrupting the electrical connection between the reinforcement steel and the anode material, a difference in potential of at least 0.2 volts, preferably of at least 0.4 volts, is measured. As the anode material, e.g. zinc, aluminium, magnesium and their alloys are suitable. The best results have been achieved with zinc and zinc alloys, e.g. zinc/aluminium alloys, as the anode material.

The inventive ion-conductive coating is characterised by a high and long-lasting ion conductivity, the ion conductivity amounting to at least 0.01 milliSiemens, preferably from 0.1 to 10 milliSiemens. The high ion conductivity preferably is achieved by admixing polyelectrolytes. As the polyelectrolytes, compounds are suitable which are capable of electrostatically binding cations and/or anions. As electrostatic binding, an ion binding is denoted which, e.g., is characteristic of salts. Particularly suitable are polyelectrolytes which act as ion exchangers, for cations, anionic polyelectrolytes, such as, e.g., polysulfonic acids, polycarboxylic acids, polyphosphonic acids, polyphosphoric acids, alumosilicates, and for anions, cationic polyelectrolytes, such as, e.g., polyimines, polyamines, polyammonium compounds. Preferably, the polyelectrolytes are dissolved in the inventive ion-conductive coating agent. Particularly good results have been obtained if both, anionic and also cationic polyelectrolytes have been admixed to the ion-conductive coating, or if so-called amphoteric polyelectrolytes have been used. Amphoteric polyelectrolytes contain both, anionic and also cationic functional groups and, therefore, are capable of ionically binding both, anions and also cations.

The ion conductivity of the inventive coating can be increased by admixing salts, such as, e.g., alkali salts and/or alkaline earth salts of hydrochloric acid, sulfuric acid, nitric acid, acetic acid, and by admixing alkaline hydroxides.

Surprisingly, it has been shown that the durability and the efficacy of the cathodic corrosion protection by means of the inventive galvanic anode was clearly improved if to the ion-conductive coating compounds were admixed which form complex compounds (also termed chelates) with the anode material, such as, e.g., ethylenediaminetetraacetic acid (EDTA), immino diacetic acid, nitrilo triacetic acid, citric acid, succinic acid, tartaric acid, polyacrylic acids, aminophosphonic acids, and the salts thereof, preferably the alkaline salts thereof, hydroxyquinoline and its derivatives, diethylene glycol, polyethylene glycol, glycerol, guanidine and its salts, benzimidazole, aminoalcohols, polyethylene imines, polyvinyl pyrrolidones.

A particular inventive embodiment of the ion-conductive coating contains polyelectrolytes which contain anode-material-complexing functional groups. If zinc has been used as the anode material, particularly good results have, e.g., been obtained by admixing polyelectrolytes containing, e.g., phosphonic acid groups, aminophosphonic acid groups, ammonium groups, amine groups, imine groups.

To improve the stability and consistency, dispersing agents, cross-linking agents, adhesion agents, water-retention agents, gelatinizing agents, thickening agents, fillers, such as, e.g., silica sand, finely ground slag, rock meal, flue ashes, microspheres of glass, etc., can be admixed. To improve the stability, consistency and adhesion on the substrate and to improve the adhesion of the anode material, synthetic resin dispersions, such as, e.g., polyacrylates, polystyrene, butadiene-styrene-copolymers, polyethers, polyketones, latex, carboxylated styrene-butadiene-copolymers, phenolic resins, epoxy resins, chloroprene etc. can be admixed to the inventive ion-conductive coating agent.

To improve adhesion on concrete, a particular inventive embodiment of the coating agent contains in situ-formed alumosilicates, as described in EP 1 068 164, wherein the alumosilicates as anionic polyelectrolytes not only increase the adhesion on concrete or steel, but also the ion conductivity of the inventive coating.

The inventive coating agent preferably is prepared as an aqueous dispersion by mixing of the components, and is applied to the substructure, e.g. to the concrete surface, by means of conventional coating techniques, such as, e.g., rolling, spraying, smoothing. Before the application of the inventive coating agent, the substructure is cleaned and, optionally, roughened, preferably by sand-blasting, slag-blasting, humid slag-blasting, high-pressure water blasting.

The inventive galvanic anode system is produced by embedding or applying a suitable anode material in/on the inventive ion-conductive coating.

Embedding the anode material in the inventive ion-conductive coating is effected, e.g., by fastening the anode material as a network or grid to the substructure, and by applying the inventive coating agent by means of spraying. The anode network or anode grid may also be embedded by smoothing on or rolling on of the inventive coating agent. A further procedure of producing the inventive galvanic anode system consists, e.g., in that at first a layer of the inventive coating agent is applied, the anode material is applied thereto, and the anode material is embedded in a second layer of the inventive binder. For the latter procedure of embedding, e.g. also punched anode foils (FIG. 1a) or stretched punched foils (FIG. 1b) are suitable.

Surprisingly, it has been shown that by admixing a fibrous anode material, e.g. fibres of zinc and/or its alloys, into the inventive binder dispersion and by applying the zinc-fibre-containing inventive binder dispersion by means of rolling, smoothing, preferably by spraying the latter to the substructure, e.g. to concrete, very good results have been obtained. For instance, zinc fibres produced from zinc wires having a diameter of 0.1 mm by cutting them to a length of from 0.5 to 2 mm, were mixed into the inventive binder dispersion by stirring them in and were applied to a concrete substructure by airless spraying to a layer thickness of 2 mm. After drying and hardening of the coating, the electric layer resistance should be 500 ohms at the most, preferably 100 ohms at the most.

Admixing powdered galvanic anode materials into the inventive coating agent also gave satisfactory results. Surprisingly, however, it has been shown that powdered galvanic anode material in combination with a powdered electrically conductive material such as, e.g., graphite powder, carbon black, nickel powder and/or in combination with an inert fibrous material, e.g. carbon fibres, graphite fibres, nickel-coated carbon fibres, nickel-coated graphite fibres, admixed with the inventive coating agent, gave very good results with regard to a long-lasting galvanic corrosion protection of steel. After drying and hardening of the coating, the electric resistance of the layer should be 500 ohms at the most, preferably 100 ohms at the most. A galvanic corrosion of the steel after consumption of the galvanic anode material should be prevented by applying a voltage of at least 0.2 volts, preferably of at least 0.5 volts, between the anode and the steel.

Electrical contacting of the inventive ion-conductive coating that contains fibrous and/or powdered anode material, to the reinforcing steel is made in the way usual for conductive coatings (EP 1 068 164), e.g. by means of niobium-enveloped and platinum-coated wires of a thickness of 0.8 mm embedded in the inventive ion-conductive coating; e.g., also wires or strips of zinc, titanium, metal- or metal-oxide-coated titanium, strips or filaments of carbon or graphite fibres may be used. The electric connection to the steel may also be made, e.g., by a sufficient number of metal pins.

As has been described above, the inventive galvanic anode system may also be constructed by applying the anode material, preferably in the form of a foil, a punched foil (FIG. 1a) or a foil provided with holes and stretched (FIG. 1b), to the inventive ion-conductive coating. To provide a sufficient and long-lasting adhesion of the foil on the inventive ion-conductive coating, suitable adhesion agents, such as, e.g., polyalkyl acrylic acid, the salts and/or esters thereof, polyalkyl-acryl cyanates, dispersible epoxy resins, polyimines, methylcelluloses and their derivatives are admixed to the inventive coating.

A further inventive embodiment consists in that a dispersion or solution containing at least one of the above-described adhesion agents is applied before the anode material is applied to the inventive ion-conductive coating.

The anode material provided on the inventive ion-conductive coating may additionally be mechanically fixed by means of suitable dowels, nails, screws, of a synthetic material or of metal, wherein via a metallic fixing, a direct electrical connection can be made to the steel that is to be protected against corrosion.

A further procedure for producing the inventive galvanic anode consists in the application of a film consisting of the anode material, preferably of zinc or its alloys, by thermal spraying, e.g. by flame spraying or by plasma spraying.

Surprisingly, it has been shown that the durability and the efficacy of galvanic zinc anodes produced by thermal spraying of zinc on the concrete surface, such as described, e.g., in EP 1 135 538 or in U.S. Pat. No. 4,506,485, can be quite remarkably enhanced by impregnating the concrete surface prior to the spraying on of zinc, by means of a solution which contains at least one compound that forms water-soluble chelates with zinc, e.g. ethylenediaminetetraacetic acid (EDTA), immino-diacetic acid, nitrilo-triacetic acid, citric acid, succinic acid, tartaric acid, polyacrylic acids, amino-phosphonic acids, and the salts thereof, preferably their alkaline salts, hydroxyquinoline and its derivatives, diethylene glycol, polyethylene glycol, glycerol, guanidine and its salts, benzimidazole, amino alcohols, polyethylene imines, polyvinyl pyrrolidones. By the formation of soluble zinc chelates, the formation of a passive layer on the interface of the zinc anode to the concrete is prevented. In U.S. Pat. No. 6,022,469, the prevention of the formation of a passive layer adversely affecting the functioning of the galvanic anode by means of an electrolyte is described whose pH is by at least 0.2 units higher than that pH at which passivation occurs. For zinc, e.g., the pH of the electrolyte is at >13.3.

If, however, the concrete surface is impregnated with a compound which forms water-soluble chelates with zinc, the formation of a passive layer is prevented even at markedly lower pH-values, e.g. at pH 12.6 (the pH of the pore solution of non-carbonized concrete). Preferably, water-soluble polyelectrolytes that form chelates with the anode material, e.g. polyaminophosphonic acids, and their salts, polyamines and/or polyimines, are used. A further improvement of the efficacy and durability of anodes sprayed onto the surface of concrete is achieved by an additional impregnation of the concrete by means of water-soluble alumo-silicates formed in situ, as described in EP 1 068 164.

The inventive galvanic anode may also be directly applied to the steel to be protected. This, in particular, has the advantage that steel structures can also be reliably and durably protected against corrosion in an environment in which no open fire can be used and where hot-galvanizing by means of thermal spraying is impossible, such as in refineries or pipelines.

A further advantage of the inventive galvanic anode system consists in that the effectiveness of the anode system can be prolonged as often as desired e.g. by renewed gluing on of anode material or by thermal spraying on of the anode material on the inventive solid electrolyte.

EXAMPLE 1

2 mortar test slabs (20*20*2 cm, 320 kg Portland cement/$m^3$, river sand 0/5 mm, w/c=0.56, 3% chloride per cement weight, admixed as sodium chloride dissolved in mixing water) were produced, which contained a grid of reinforcing steel (mesh width 1 cm, diameter of steel rods 3 mm). The mortar prisms were stored for 28 days at 95% relative humidity and then subjected to weathering for further 2 months.

TABLE 1

| Component A: Ingredient | Parts by Weight |
|---|---|
| Polybutylacrylate-acrylic acid copolymer, sodium salt | 65.8 |
| Polyethylene-imine | 95.6 |
| Polystyrene-butylacrylate acrylic acid copolymer | 77.5 |
| Methyl cellulose | 6.5 |
| Polyoxyethylene-sulfonate, sodium salt | 4.5 |
| Lithiumchloride | 22.5 |
| Metakaolin | 62.2 |
| Silica flour (0-0.25 mm) | 432.8 |
| Deionized water | 232.6 |
| Sum | 1000 |

For producing the ion-conductive coating agent, the components listed in Table 1 were mixed in a compulsory mixer by stirring. 1000 parts of the thus-prepared dispersion (component A) were mixed with 160 parts of potash waterglass K35 (component B) containing 26% $SiO_2$ and 17% $K_2O$.

100 g of the thus-prepared inventive coating agent were applied to the mortar test slab by rollers. After approximately 2 hours, after the dispersion had become stiff on the mortar test slabs and had started to harden, a zinc foil (diameter 0.25 mm) was glued on and pressed to the coating by means of a wallpaper roller.

After hardening of the coating agent, after approximately 12 hours, a copper strand was soldered to the zinc foil. The difference in potential between the zinc foil and the steel grid embedded in the mortar test slab was 0.87 volts at the beginning and stabilized after approximately 12 hours at approximately 0.67 volts. The copper strand wire was electrically connected with the steel network via a 1 ohm resistor. The current flowing between the zinc foil and the steel network grid was measured via the voltage drop at the 1 ohm resistor. At the beginning, the current flow was 0.56 mA (14 $mA/m^2$) and stabilized after approximately 12 hours at 0.30 mA (7.5 $mA/m^2$). At the side of the mortar test slab located opposite the zinc foil, the potential of the steel network was measured versus a pressed-on copper/copper sulphate electrode (CSE). The potential of the steel network before making the electrical connection was −397 mV, after having made the electrical connection, the potential of the steel reinforcement stabilized at approximately −760 mV.

The test slabs were stored in an air-conditioned chamber at 75% relative humidity and ambient temperature (approximately 22° C.). The current flow between zinc foil (zinc anode) and the steel network (cathode) was electronically recorded at 1 hour intervals and stored on a PC.

The test and measurement arrangement is schematically illustrated in FIG. 2: On the mortar test slab (A) in which the steel grid (B) is embedded, the inventive ion-conductive coating (C) is applied, to which the zinc foil (D) is glued. The zinc anode (D) is connected to the reinforcement network (B) via a 1 ohm resistor (E) via copper strand wires. The electric connection can be interrupted by a switch (G). The difference in potential between the zinc anode (D) and the steel network (B) is recorded by a data recording system (I). According to Ohm's law, the difference in potential corresponds to the electric current flowing between the zinc anode (D) and the steel network (B). The electrochemical potential of the steel reinforcement is measured by a voltmeter (G) with 10 MOhm input impedance, versus a CSE electrode (J).

The values of the current flow between zinc anode and steel network measured over the period of one year are summarized in Table 2.

TABLE 2

| Time in Days | Current Flow Measured [mA] | Current Flow/$m^2$ Anode [$mA/m^2$] |
|---|---|---|
| 0 | 0.56 | 14.0 |
| 1 | 0.28 | 7.0 |
| 10 | 0.25 | 6.3 |
| 30 | 0.20 | 5.0 |
| 60 | 0.19 | 4.8 |
| 90 | 0.20 | 5.0 |
| 180 | 0.18 | 4.5 |
| 360 | 0.20 | 5.0 |

The current flow between zinc anode and steel network cathode stabilizes after approximately 30 days and remains nearly constant over the measurement period. An increase in the electrolyte resistance due to the passivation of the zinc anode thus does not occur. After 30, 90 and 270 days, the potential drop of the steel reinforcement versus a CSE electrode was determined according to European Standard EN 12696 after having interrupted the current flow between zinc anode and steel network. With 170 mV, 145 mV and 149 mV, the values measured 24 hours after interruption of the current flow were clearly above the criterion of 100 mV given in EN 12696. Thus, the steel grid was clearly protected against corrosion.

The uncoated and untreated reference mortar test slab clearly showed to be damaged after one year (crack formation in the mortar, formation of rust streaks) due to the steel corrosion caused by the chloride in the mortar.

EXAMPLE 2

As described in Example 1, two mortar test slabs were produced. As described in Example 1, the ion-conductive coating agent was prepared by mixing component A which was comprised of the components listed in Table 3 with potash waterglass K35 at a ratio of 1000/165 parts.

On the surface of the mortar test body, a zinc network (mesh width 4 mm, wire thickness 0.8 mm) was fixed with polypropylene clips. The zinc network was embedded by means of the airless spray method by application of 150 g each of the coating agent prepared by mixing component A with component B.

After approximately 12 hours, when the coating agent had hardened, a copper strand was soldered to the zinc network. Initially, the difference in voltage between the zinc network and the steel network embedded in the two mortar test slabs was 0.84 volts in slab 1, 0.87 volts in slab 2, and stabilized after approximately 12 hours at approximately 0.65 volts (slab 1) and at approximately 0.63 volts (slab 2). As described in Example 1, the copper strand wire was electrically connected to the steel network via a 1 ohm resistor, and the current flowing between the zinc network and the steel grid was measured. Initially, the current flow was 0.60 mA (15 $mA/m^2$ concrete surface) in slab 1, and 0.62 mA (15.5 $mA/m^2$ concrete surface) in slab 2 and stabilized after approximately 12 hours at 0.32 mA (8 $mA/m^2$) in slab 1 and at 0.34 mA (8.6 $mA/m^2$) in slab 2. The potential of the steel network before making the electric connection was −384 mV vs. CSE in slab 1 and −392 mV vs. CSE in slab 2, after having made the electric connection, the potential of the steel reinforcement stabilized at approximately −778 mV in slab 1 and at −785 mV in slab 2.

The test plates were stored in an air-conditioned chamber at 75% relative humidity and ambient temperature (approximately 22° C.) The current flow between zinc foil (zinc anode) and the steel network (cathode) was measured as described in Example 1 and recorded. After a measurement period of 30 days, slab 2 was immersed by about 5 mm in standing water in the climate chamber in a basin on the side facing away from the galvanic anode. After approximately 1 week, the water was sucked upwards as far as to the interface mortar slab/galvanic anode.

The values of the current flow between zinc anode and steel network measured over a period of half a year are summarized in Table 4.

TABLE 3

| Component A: Ingredient | Parts by Weight |
|---|---|
| Aminomethylene polyphosphonic acid, sodium salt | 112.7 |
| Poly-butylacrylate | 100.0 |
| Methylcellulose | 10.1 |
| Polyoxyethylene-glycol-ether | 13.6 |
| Lithium nitrate | 28.2 |
| Metakaolin | 64.5 |
| Silica flour (0-0.25 mm) | 427.3 |
| Deionized water | 243.6 |
| Sum | 1000 |

TABLE 4

| | Slab 1 | | Slab 2 | |
|---|---|---|---|---|
| Time in days | Current flow measured [mA] | Current flow/m$^2$ [mA/m$^2$] | Current flow measured [mA] | Current flow/m$^2$ [mA/m$^2$] |
| 0 | 0.60 | 15.0 | 0.62 | 15.5 |
| 1 | 0.34 | 9.0 | 0.34 | 8.8 |
| 10 | 0.25 | 7.2 | 0.25 | 7.0 |
| 30 | 0.20 | 6.0 | 0.2 | 6.3 |
| 60 | 0.19 | 5.5 | 0.19 | 9.0 |
| 90 | 0.20 | 5.3 | 0.2 | 8.8 |
| 180 | 0.18 | 5.4 | 0.18 | 8.9 |

After approximately 30 days, the current flow between zinc anode and steel network cathode stabilizes in analogy with the zinc anode described in Example 1 and glued to the ion-conductive coating and remains nearly constant in the mortar test slab 1 over the measurement period of half a year. The moisture penetration of mortar test slab 2 clearly causes an increase in current flow: The moisture penetration of the mortar lowers the resistance of the concrete and, thus, increases the flow of current.

As in Example 1, no increase in the electrolyte resistance due to the passivation of the zinc anode was seen. After 30, 90 and 180 days, the potential drop of the steel reinforcement vs. a CSE electrode after having interrupted the current flow between zinc anode and steel network was determined according to EN 12696. At 185 mV, 156 mV and 152 mV for slab 1 and 147 mV, 129 mV and 127 mV for slab 2, the values measured 24 hours after interruption of the current flow were clearly above the criterion of 100 mV given in EN 12696. The steel grid thus was clearly protected against corrosion. The example shows that with the galvanic anode according to the invention, the steel reinforcement can be protected against corrosion also in structural elements highly penetrated by moisture, in contrast to the galvanic anode system in which the zinc foil, provided with an adhesive hydrogel layer (EP 0 668 373) would become detached from the concrete substructure because of the water uptake by the hydrogel.

EXAMPLE 3

As described in Example 1, two mortar test slabs were produced the ion-conductive coating agent was prepared as described in Example 1 by mixing component A which consisted of the components listed in Table 5, with potash waterglass K35 at a ratio of 1000/120 parts.

A zinc network (mesh width 4 mm, wire thickness 0.8 mm) was fixed to the surface of the mortar test body by means of polypropylene clips. The zinc network was embedded by means of the airless spray method by applying 200 g each of the coating agent prepared by mixing of component A with component B.

After approximately 24 hours, when the coating agent had hardened, a copper strand was soldered to the zinc network. Initially, the difference in voltage between the zinc network and the steel network embedded in the two mortar test slabs was 0.82 volts in slab 1, 0.85 volts in slab 2, and stabilized after approximately 12 hours at approximately 0.63 volts (slab 1) and at approximately 0.61 volts (slab 2). As described in Example 1, the copper strand wire was electrically connected to the steel network via a 1 ohm resistor, and the current flowing between the zinc network and the steel grid was measured. Initially, the current flow was 0.75 mA (19 mA/m$^2$ concrete surface) in slab 1, and 0.72 mA (18 mA/m$^2$ concrete surface) in slab 2 and stabilized after approximately 12 hours at 0.43 mA (11 mA/m$^2$) in slab 1 and at 0.38 mA (9.5 mA/m$^2$) in slab 2. The potential of the steel network before making the electric connection was −397 mV vs. CSE in slab 1 and −405 mV vs. CSE in slab 2, after having made the electric connection the potential of the steel reinforcement stabilized at approximately −783 mV in slab 1 and at −765 mV in slab 2.

The test plates were stored in an air-conditioned chamber at 75% relative humidity and ambient temperature (approximately 22° C.). The current flow between zinc foil (zinc anode) and steel network (cathode) was measured as described in Example 1 and recorded.

The values of the current flow between zinc anode and the steel network over a period of half a year are summarized in Table 6.

TABLE 5

| Component A: Ingredient | Parts by weight |
|---|---|
| Polybutyl-styrene acrylate | 270 |
| Isotridecanol-ethoxylate | 1.7 |
| Dodecanol-ethoxylate | 1.7 |
| Polyethylene-imine 50% solution | 70 |
| Polystyrene sulfonic acid 50% solution | 70 |
| Butyl-glycol | 30 |
| Polyglycol MW 600 | 13.6 |
| Deionized water | 73 |
| Polyvinylpyrrolidone 20% solution | 70 |
| Metakaolin | 100 |
| Powdered limestone <30 μm | 300 |
| Sum | 1000 |

TABLE 6

| Time in days | Slab 1 | | Slab 2 | |
| --- | --- | --- | --- | --- |
| | Current flow measured [mA] | Current flow/m² [mA/m²] | Current flow measured [mA] | Current flow/m² [mA/m²] |
| 0 | 0.75 | 18.75 | 0.72 | 18.00 |
| 1 | 0.40 | 10.00 | 0.37 | 9.25 |
| 10 | 0.31 | 7.75 | 0.29 | 7.25 |
| 30 | 0.26 | 6.5 | 0.24 | 6.00 |
| 60 | 0.24 | 6.00 | 0.23 | 5.75 |
| 90 | 0.23 | 5.75 | 0.22 | 5.50 |

After approximately 30 days, the current flow between zinc anode and steel network cathode stabilizes in analogy with the zinc anode described in Example 1 and glued to the ion-conductive coating. As in Example 1, no increase in the electrolyte resistance due to the passivation of the zinc anode was seen. After 30 and 90 days, the potential drop of the steel reinforcement vs. a CSE electrode after having interrupted the current flow between zinc anode and steel network was determined according to EN 12696. At 195 mV and 162 mV for slab 1 and 157 mV and 136 mV for slab 2, the values measured 24 hours after interruption of the current flow were clearly above the criterion of 100 mV given in EN 12696. The steel grid thus was clearly protected against corrosion. The Example shows that with the galvanic anode according to the invention, the steel reinforcement can be protected against corrosion also in structural elements highly penetrated by moisture, in contrast to the galvanic anode system in which the zinc foil, provided with an adhesive hydrogel layer (EP 0 668 373) would become detached from the concrete substructure because of the water uptake by the hydrogel.

EXAMPLE 4

A mortar test slab was produced as described in Example 1.

For preparing the ion-conductive coating agent, the components listed in Table 7 were mixed in a compulsory mixer by stirring.

100 g of the thus-prepared coating agent according to the invention were applied to the mortar test slab by means of rollers. After approximately 2 hours, after the dispersion on the mortar test slabs had become stiff and began to harden, a zinc foil (diameter 0.25 mm) was glued on and pressed to the coating with a wallpaper roller.

Voltage measurement, current measurement and storage of the test bodies was effected as described in Example 1.

The values of the current flow between zinc anode and steel network measured over a period of 90 days are summarized in Table 8.

TABLE 7

| | Parts by weight |
| --- | --- |
| Polybutyl-methyl-metacrylate | 550 |
| Isotridecanol-ethoxylate | 6 |
| Sodium polyacrylate | 11 |
| Lithium chloride | 10 |
| 8-Hydroxy-quinoline | 20 |
| Glycerol | 60 |
| Polyglycol MW 600 | 30 |
| Powdered limestone <30 μm | 265 |
| Aerosil | 15 |
| Deionized water | 13 |
| Polyacrylic acid-polyamide copolymer | 20 |
| Sum | 1000 |

TABLE 8

| Time in days | Current flow measured [mA] | Current flow/m² [mA/m²] |
| --- | --- | --- |
| 0 | 0.69 | 17.25 |
| 1 | 0.45 | 11.25 |
| 10 | 0.39 | 9.75 |
| 30 | 0.28 | 7.00 |
| 60 | 0.26 | 6.50 |
| 90 | 0.25 | 6.25 |

The Examples show that with the inventive galvanic anode the steel reinforcement in structural elements of concrete can be reliably and lastingly protected against corrosion. In contrast to the zinc foil provided with a hydrogel layer (EP 0 668 373), the inventive ion-conductive coating agent is cost-effective and simple to produce and to apply and, above all, can be stored to a nearly unlimited extent. Moreover, with the inventive galvanic anode system, also in structural elements which are highly penetrated by moisture, the steel reinforcement can be reliably and lastingly protected against corrosion.

The invention claimed is:

1. A method of producing a galvanic anode system, said method comprising:
   impregnating the surface of a concrete substructure with an ion-conductive coating agent; applying a galvanic anode material to the ion-conductive coating agent or embedding a galvanic anode material in the ion-conductive coating agent; and
   drying the ion-conductive coating agent.

2. The method according to claim 1, wherein the galvanic anode material is selected from the group consisting of zinc, aluminum, magnesium, zinc alloys, aluminum alloys, magnesium alloys, and combinations thereof.

3. The method according to claim 1, wherein the concrete substructure is roughened by one or more of sand blasting, slag blasting, humid slag blasting, or high pressure washing before the surface of the concrete substructure is impregnated with the ion-conductive coating agent.

4. The method according to claim 1, wherein the anode material is applied to the ion-conductive coating agent by a thermal spraying method.

5. The method according to claim 4, wherein the thermal spraying method is flame spraying, plasma spraying, or a combination thereof.

6. The method of claim 1, wherein the ion-conductive agent comprises a mixture of:
   a) polybutylacrylate-acrylic acid copolymer, sodium salt;
   b) polyethylene-imine;
   c) polystyrene-butylacrylate acrylic acid copolymer;
   d) methyl cellulose;
   e) polyoxyethylene-sulfonate, sodium salt;
   f) lithium chloride;
   g) metakaolin;
   h) silica flour;
   i) deionized water; and
   j) potash waterglass K35.

7. The method of claim 1, wherein the ion-conductive agent comprises a mixture of:
   a) aminoethylene polyphosphonic acid, sodium salt;
   b) poly-butylacrylate;
   c) methyl cellulose;
   d) polyoxyethylene-glycol ether;
   e) lithium nitrate;
   f) metakaolin;

g) silica flour;
h) deionized water; and
i) potash waterglass K35.

8. The method of claim 1, wherein the ion-conductive agent comprises a mixture of:
a) polybutyl-styrene acrylate;
b) isotridecanol-ethoxylate;
c) dodecanol-ethoxylate;
d) polyethylene-imine;
e) polystyrene sulfonic acid;
f) butyl-glycol;
g) polyglycol MW 600;
h) polyvinylpyrrolidone;
i) metakaolin;
j) deionized water;
k) powdered limestone; and
l) potash waterglass K35.

9. The method of claim 1, wherein the ion-conductive agent comprises a mixture of:
a) polybutyl-methyl-methacrylate;
b) isotridecanol-ethyoxylate;
c) sodium polyacrylate;
d) lithium chloride;
e) 8-hydroxy-quinoline;
f) glycerol;
g) polyglycol;
h) powdered limestone;
i) aerosil;
j) deionized water; and
k) polyacrylic acid-polyamide copolymer.

10. The method according to claim 1, wherein the galvanic anode material is zinc foil or a zinc network having a mesh width of 4 mm to 8 mm.

11. The method of claim 1, wherein the ion-conductive coating agent is applied to the surface of the concrete substructure as an aqueous dispersion or suspension.

12. The method according to claim 1, wherein the concrete substructure comprises concrete and a steel reinforcement.

13. The method according to claim 12, further comprising electrically connecting the galvanic anode material to said steel reinforcement.

14. The method according to claim 12, wherein said steel reinforcement comprises a grid of steel rods.

15. A method of producing a galvanic anode system, said method comprising:
admixing an ion-conductive coating agent with a galvanic anode material to form an admixture;
impregnating the surface of a concrete substructure with said admixture; and
drying the admixture to form a galvanic anode system.

16. The method of claim 15, wherein the galvanic anode material is selected from the group consisting of powdered zinc, powdered aluminum, powdered magnesium, powdered zinc alloys, powdered aluminum alloys, powdered magnesium alloys, and mixtures thereof.

17. The method of claim 16, further comprising admixing a fibrous material with said powdered electrically conductive material, wherein said fibrous material is selected from the group consisting of carbon fibers, graphite fibers, nickel-coated carbon fibers, and nickel-coated graphite fibers.

18. The method of claim 15, further comprising admixing a powdered electrically conductive material with said galvanic anode material and said ion-conductive coating agent, wherein said powdered electrically conductive material is selected from the group consisting of graphite powder, carbon black, and nickel powder.

19. The method of claim 15, wherein the ion-conductive agent comprises a mixture of:
a) polybutylacrylate-acrylic acid copolymer, sodium salt;
b) polyethylene-imine;
c) polystyrene-butylacrylate acrylic acid copolymer;
d) methyl cellulose;
e) polyoxyethylene-sulfonate, sodium salt;
f) lithium chloride;
g) metakaolin;
h) silica flour;
i) deionized water; and
j) potash waterglass K35.

20. The method of claim 15, wherein the ion-conductive agent comprises a mixture of:
a) aminoethylene polyphosphonic acid, sodium salt;
b) poly-butylacrylate;
c) methyl cellulose;
d) polyoxyethylene-glycol ether;
e) lithium nitrate;
f) metakaolin;
g) silica flour;
h) deionized water; and
i) potash waterglass K35.

21. The method of claim 15, wherein the ion-conductive agent comprises a mixture of:
a) polybutyl-styrene acrylate;
b) isotridecanol-ethoxylate;
c) dodecanol-ethoxylate;
d) polyethylene-imine;
e) polystyrene sulfonic acid;
f) butyl-glycol;
g) polyglycol MW 600;
h) polyvinylpyrrolidone;
i) metakaolin;
j) deionized water;
k) powdered limestone; and
l) potash waterglass K35.

22. The method of claim 15, wherein the ion-conductive agent comprises a mixture of:
a) polybutyl-methyl-methacrylate;
b) isotridecanol-ethyoxylate;
c) sodium polyacrylate;
d) lithium chloride;
e) 8-hydroxy-quinoline;
f) glycerol;
g) polyglycol;
h) powdered limestone;
i) aerosil;
j) deionized water; and
k) polyacrylic acid-polyamide copolymer.

23. A method of producing a galvanic anode system, said method comprising:
applying a galvanic anode material to the surface of a concrete substructure;
embedding said galvanic anode material in an ion-conductive coating agent; and
drying the ion-conductive coating agent.

24. The method of claim 23, wherein the ion-conductive agent comprises a mixture of:
a) polybutylacrylate-acrylic acid copolymer, sodium salt;
b) polyethylene-imine;
c) polystyrene-butylacrylate acrylic acid copolymer;
d) methyl cellulose;
e) polyoxyethylene-sulfonate, sodium salt;
f) lithium chloride;
g) metakaolin;
h) silica flour;

i) deionized water; and
j) potash waterglass K35.

25. The method of claim 23, wherein the ion-conductive agent comprises a mixture of:
a) aminoethylene polyphosphonic acid, sodium salt;
b) poly-butylacrylate;
c) methyl cellulose;
d) polyoxyethylene-glycol ether;
e) lithium nitrate;
f) metakaolin;
g) silica flour;
h) deionized water; and
i) potash waterglass K35.

26. The method of claim 23, wherein the ion-conductive agent comprises a mixture of:
a) polybutyl-styrene acrylate;
b) isotridecanol-ethoxylate;
c) dodecanol-ethoxylate;
d) polyethylene-imine;
e) polystyrene sulfonic acid;
f) butyl-glycol;
g) polyglycol MW 600;
h) polyvinylpyrrolidone;
i) metakaolin;
j) deionized water;
k) powdered limestone; and
l) potash waterglass K35.

27. The method of claim 23, wherein the ion-conductive agent comprises a mixture of:
a) polybutyl-methyl-methacrylate;
b) isotridecanol-ethyoxylate;
c) sodium polyacrylate;
d) lithium chloride;
e) 8-hydroxy-quinoline;
f) glycerol;
g) polyglycol;
h) powdered limestone;
i) aerosil;
j) deionized water; and
k) polyacrylic acid-polyamide copolymer.

* * * * *